Figures 1, 2, 3:
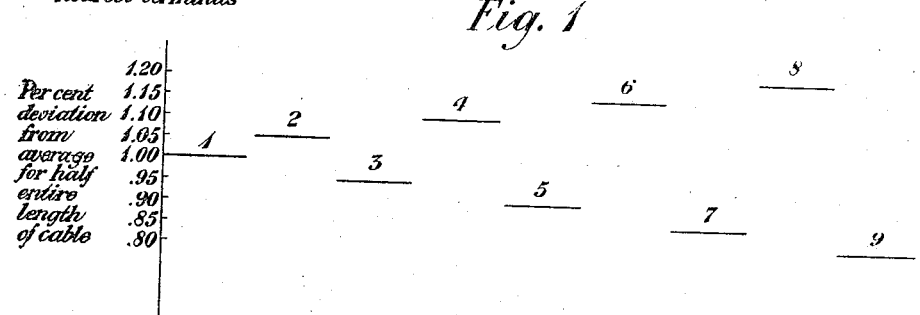

Oct. 28, 1924.

H. W. HITCHCOCK

SIGNALING SYSTEM

Filed Oct. 20, 1921

1,512,930

INVENTOR
H.W. Hitchcock
BY
ATTORNEY

Patented Oct. 28, 1924.

1,512,930

UNITED STATES PATENT OFFICE.

HARRY W. HITCHCOCK, OF NEW YORK, N. Y., ASSIGNOR TO AMERICAN TELEPHONE AND TELEGRAPH COMPANY, A CORPORATION OF NEW YORK.

SIGNALING SYSTEM.

Application filed October 20, 1921. Serial No. 508,946.

*To all whom it may concern:*

Be it known that I, HARRY W. HITCHCOCK, residing at New York, in the county of Bronx and State of New York, have invented certain Improvements in Signaling Systems, of which the following is a specification.

This invention relates to signaling systems and particularly to a method and means for constructing a cable from a plurality of sections in order to minimize the effect upon transmission of signals caused by irregularities in the impedance of the various sections of which the cable is composed. In balancing a cable it is, of course, necessary to make detailed adjustments of the balancing network to match the irregularities in the cable, and my invention involves the systematic arrangement of the sections of the cable so that the adjustment of the balancing network is facilitated.

In the construction of long cables such, for example, as a long submarine cable, it is necessary to manufacture the cable in relatively short sections and to splice the various sections together in order to produce the complete cable. Although such cables are designed to have a definite impedance value it is well known that the various sections will differ in varying degrees, due to various factors in the process of manufacture of a cable.

It is the object of this invention to provide a method and means for splicing together the various sections of a cable in order to produce a complete cable which will offer the least interference with transmission, due to the impedance irregularities of the various sections of which the completed cable is composed.

This invention will be better understood from the following description when read in connection with the attached drawing, of which Figure 1 represents for example nine sections approximately equal in length which form one-half of the completed cable. Fig. 2 shows graphically the arrangement of these sections with respect to their per cent deviation from the average impedance value of the entire half length of completed cable, and Fig. 3 shows graphically the effect produced upon the impressed signaling voltage by the arrangement of the sections of cable as shown in Fig. 2.

Upon the completion of the manufacture of all the sections of cable for an entire cable that is intended to extend between two points, the impedance of each section of cable is measured and the average value for each half length, that is to say, the distance from each terminus to the midpoint, is obtained. For the purpose of describing this invention, I have shown in Fig. 1 nine sections designated 1 to 9 inclusive, which represent for example one-half the length of the entire cable that extends from one terminus to the midpoint of the said cable. Section No. 1 represents that nearest the terminus of this half length of cable and the other sections have been numbered consecutively in the direction extending away from the said terminus. The order of arrangement of these sections depends upon their impedance, which should be determined by the quantity $\sqrt{\frac{L}{C}}$, where L and C represent respectively the inductance and capacity of the sections. In this determination the resistance and leakage may be disregarded, since for the important part of the telephone frequency range their effects on the impedance are relatively small.

When the quantity $\sqrt{\frac{L}{C}}$ has been obtained for all the sections of cable intended to constitute the half length of completed cable from one terminus to the midpoint of the said cable, the average value of $\sqrt{\frac{L}{C}}$ for this entire half length of cable should be obtained, and the percentage by which each section differs from the average should be determined. The section of cable whose impedance, as defined above, is substantially equal to the average for the entire half length of cable, should be selected for the end of the cable nearest the terminus. If no section of cable has substantially the same impedance value as the average, then that section should be chosen for the terminus of the cable which more nearly approximates the average value, and the percentage deviation of impedance of the other sections of cable from this selected section of cable should be obtained. The other sections of cable should then be selected and joined together in accordance with the magnitude of their deviation from the average, the section having the least deviation being connected with the terminating section and the section having the greatest deviation being placed at the point most remote from the terminating section, viz, at the midpoint of the completed cable. Thus, the distance of a particular section of cable from the terminus of the cable will depend upon the relative value of its impedance deviation to the average value of the entire half length of cable. Furthermore, since the impedance of approximately one-half of the entire number of sections will be above the average and the other half below the average, the consecutive sections should not only be arranged so that their impedance deviation will increase from the terminus outward toward the center of the cable but the adjacent sections should alternate positively and negatively from the average value. This is clearly shown in Fig. 2, in which the terminating section, No. 1, is shown as having the value of unity and the adjacent section, 2, having the value of $\frac{5}{10}$ of 1% above No. 1. The subsequent pairs of sections, 4 and 5, 6 and 7, 8 and 9, are each made up of sections having respectively positive and negative deviations of the same magnitude. These deviations are assumed but they serve to illustrate the principle upon which this invention is based. In a similar manner the other half length of cable is built up so that the section of minimum deviation is at the distant terminus, and the sections of maximum deviation are at the midpoint of the cable. It will be apparent, therefore, that the completed cable tapers in impedance deviation from the midpoint in both directions to the two terminals of the cable.

For the frequencies within the telephone range, such an arrangement of lengths produces the minimum deviation from the average impedance since the lengths are short enough so that the phase difference, due to the impedance irregularities of successive sections, when viewed from each terminal of the cable is small. This is clearly shown in Fig. 3. In this figure $f_0$ represents the limiting frequency for the necessary voice range for telephoning; and ($a$) represents the effective resistance of a cable whose sections are uniform and have a value of $\sqrt{\frac{L}{C}}$ equal to the average. In ($b$) is shown the deviation from this desired impedance curve due to the two sections 2 and 3 taken separately and also the combined effect of these two which is shown as curve 23. In Fig. 3 ($c$) is shown the same effect for two adjacent sections 6 and 7 located at a greater distance from the input end. Although the actual deviations of the sections 6 and 7 are greater than those of 2 and 3 the attenuation of the cable between the sending end and their position reduces their effect upon the sending end impedance. It is obvious that if 2 and 3 or 6 and 7 were of the same sign the combined effect of the two would be approximately twice as great as either taken alone. Also the more nearly 2 and 3 are equal in magnitude the smaller will be the resultant 23. This average cannot become zero owing to the fact that sections 2 and 3 are not equidistant from the input end. The effect of this is to make the frequencies 12 and 13 at which the curves 2 and 3 cross the frequency axis different. These frequencies approach each other and also become higher as the length of the sections is reduced. Hence by decreasing the length of the sections a better balance may be secured. Within the range of frequencies represented by the voice, there is but a slight phase difference due to the difference in position of successive sections and consequently the effect on transmission will be small.

Although this invention has been disclosed in a certain form it is not intended to limit it to this particular form since it is capable of embodiment in other forms within the spirit and scope of the appended claims.

What is claimed is:

1. In a signaling system, the method of constructing a cable comprising a plurality of sections, which consists in measuring the impedance of each of the said sections, obtaining the average impedance of all the sections measured, arranging the sections in such order that the section at each terminus shall have the value nearest the average, and arranging the subsequent pairs of adjacent sections between each terminus and the midpoint of the cable in the order of increasing deviation, the adjacent sections of each pair having approximately equal positive and negative deviations.

2. In a signaling system, the method of constructing a cable comprising a plurality of sections, which consists in measuring $\sqrt{\frac{L}{C}}$ value of each of the said sections, obtaining the average of $\sqrt{\frac{L}{C}}$ value for all the sections measured, arranging the sections in such order that the section at each terminus shall have $\sqrt{\frac{L}{C}}$ value nearest the average, and the subsequent pairs of adjacent sections shall have approximately equal positive and negative deviations from the average, the values increasing in the direction toward the center of the cable.

3. A cable comprising a plurality of sections the impedances of which deviate uniformly from the average value of said impedances from the terminals to the midpoint of the said cable.

4. In a signaling system, the method of constructing a cable comprising a plurality of sections, which consists in measuring the impedance of each of the sections, obtaining the average impedance of all the sections measured, arranging the sections in such order that the section at each terminus shall have the value nearest the average, and arranging the subsequent pairs of adjacent sections in the order of increasing deviation from the average, the adjacent sections of each pair having approximately equal positive and negative deviations.

5. A cable comprising a plurality of sections, the impedances of which deviate uniformly from the average value for all sections in the direction away from the terminal sections of the said cable.

6. A cable comprising a plurality of sections so arranged that each terminal section shall have an impedance approximating the average impedance of all the sections extending between each respective terminal and the midpoint of the said cable, and the subsequent pairs of sections of each half section of the cable shall increase in impedance in the direction away from each terminal section, the adjacent sections of each pair having approximately equal positive and negative deviations from the average.

7. A length of submarine cable comprising a plurality of sections in series, the terminal section to which signaling instruments are to be connected having an impedance which is about the average of that of all of said sections, and the remaining sections from said terminal section toward the other terminal having values of impedance alternately higher and lower than that of said terminal section.

8. A length of submarine cable comprising a plurality of sections in series, the terminal section to which signaling instruments are to be connected having an impedance which is about the average of that of all of said sections, and the remaining sections from said terminal section toward the other terminal having values of impedance alternately higher and lower than that of said terminal section, the difference between the impedance of each section and that of said terminal section being progressively greater in the direction away from said terminal section.

9. The method of constructing a signaling cable comprising a plurality of sections in series, which comprises measuring the impedance of each of a plurality of sections and arranging them with a section of about average impedance at a terminal to which signaling apparatus is to be connected and with sections of high and low values of impedance in alternation successively along the cable for at least a part of its length.

In testimony whereof, I have signed my name to this specification this 18th day of October, 1921.

HARRY W. HITCHCOCK.